United States Patent [19]

Husu

[11] Patent Number: 5,120,158
[45] Date of Patent: Jun. 9, 1992

[54] APPARATUS AND METHOD FOR HEATING A PLAYFIELD

[76] Inventor: Aarne Husu, Vattuvuorenkatu 1, SF-78200 Varkaus, Finland

[21] Appl. No.: 522,255

[22] Filed: May 11, 1990

[51] Int. Cl.$^5$ .............................................. E02C 11/00
[52] U.S. Cl. .................................. 405/43; 405/36; 405/45
[58] Field of Search ..................... 405/36, 37, 38, 43, 405/45, 39, 40

[56] References Cited

U.S. PATENT DOCUMENTS

| | | | |
|---|---|---|---|
| 1,018,251 | 2/1912 | McKee | 405/37 |
| 1,967,803 | 7/1934 | Boland | 405/131 X |
| 3,114,243 | 12/1963 | Winters | 405/37 |
| 3,908,385 | 9/1975 | Daniels et al. | 405/37 |
| 4,462,184 | 7/1984 | Cunningham | 405/37 X |
| 4,538,377 | 9/1985 | Thornton | 405/39 X |

FOREIGN PATENT DOCUMENTS

| | | | |
|---|---|---|---|
| 2228158 | 1/1974 | Fed. Rep. of Germany | 405/131 |
| 2525114 | 12/1976 | Fed. Rep. of Germany | 405/37 |

*Primary Examiner*—Dennis L. Taylor
*Attorney, Agent, or Firm*—Brooks & Kushman

[57] ABSTRACT

A pipe arrangement for a playfield is disclosed which includes a surface layer and a filter layer beneath the surface layer. In the filter layer, there is situated an arrangement of pipes, divided into several sections. In each section, there are numerous perforated multi-purpose pipes to dry the field and to circulate warm air into it. These multi-purpose pipes are connected at intervals by their ends to a distribution pipe and these in their turn at intervals by their ends to a main pipe, which is finally connected to blowing machinery by means of a feed pipe. The invention is primarily intended to be used in connection with grassy playfields, but it can also be applied to the construction of other types of fields.

3 Claims, 4 Drawing Sheets

APPARATUS AND METHOD FOR HEATING A PLAYFIELD

TECHNICAL FIELD

This invention relates to apparatus and method for de-freezing and drying a playfield.

BACKGROUND ART

The use of outdoor playfields is more or less limited by the prevailing natural conditions. In the northern latitudes, acceptable winter use is not feasible, but in Central Europe, football fields are kept open through the winter by heating the field and removing snow which has accumulated on the surface of the field. In spring too, field use is limited by rainwater. Often, a good field drain network is arranged to remove water rapidly from the field. The surface of a field may also freeze in winter, in which case de-freezing is also necessary. A field that has not been used all winter can freeze to a considerable depth. In Northern America, similar problems occur with baseball and football fields.

Various systems have been developed for the de-freezing and drying of a playfield. These are electrical, fluid, and air heated systems. Electrical heating is implemented by means of electrical resistance elements buried in the field, fluid heating by communicating heated fluid through a network of heating pipes and air heating by communicating heated air through an air distribution pipe network.

Watering a playfield from below, as so-called damming watering, requires aerial irrigation even in connection with air blowing systems.

If a pipe network is used as a field drain system, one end of it must be located higher up than the rest of the system and form a continuously descending pipe structure for run-off water.

All in all, the most important tasks for the pipe network are the drying and de-freezing of the field with the aid of blow air and the removal of water from the field. The optimal range of moisture in the growing layer is typically 9–13%. This range depends on the type of ground among other things. The organic activities of plants demand a temperature of at least 7° C.

Pipe networks suitable for blowing hot air in a field structure are shown in the German Patent Publications DE 924 931 and DE 938 850 as well as in German Patent Applications DE 2 059 383, 2 005 378, 2 005 412, and 2,738 133. The most common way of arranging the pipe network is shown in the first publication, in which the main channel is led longitudinally over the field and is connected to transverse multi-purpose pipes. Here these are used both to warm the field and to act as field drain pipes. Arranged in this way the distribution of the heat in the multi-purpose pipes is extremely uneven, because the pipes become half the length of the field. Otherwise too it is quite possible that the air flow in different parts of the field are not even, because air tries to escape through the point of least resistance.

Application publications 2,738,133 and 2,059,383 show pipe network systems that are divided into several parts, and in which the pipe network is fed from four separate blowers at the four corners. In this case, the distribution of heat and airflow is more even, because random variations between different parts of the field do not have as great of an effect as they would if the entire field had a single unified pipe network. In any event, in these too, the multi-purpose pipes for each section of the field become quite long. This pipe length can result in unevenness in the distribution of heat and airflow over the length of the pipe. Also, the use of four blowers mean large investments.

In order to improve the removal of water it is also possible to connect a pump or a vacuum source to the pipe network, as is shown for example in publications 2,738,133 and 2,005,378. This leads to a quite complicated arrangement, as can be seen in the latter publication.

The normal method of de-freezing a field is to remove any possible snow layer, and field heat it until the frozen water has melted and the field is dried. If there is much snow on the surface and the field is frozen to a substantial depth, the known systems require a great heat output.

DISCLOSURE OF INVENTION

An object of the present invention is to provide a new kind of playfield pipe network arrangement for de-freezing playfields. Another object is to provide a field pipe network in which a smaller heat output is required resulting in energy savings. A further object of the invention is to provide a field pipe network in which the heating, drying and the de-freezing of the surface layer of the field are even over the entire field.

In carrying out the above objects and other objects of the invention, air blowing forms channels in the surface layer of the field along which excess water can flow quite rapidly to an arrangement of pipes. By means of the invention, the excess water is not evaporated as it is in known heating systems; instead, it is drained to the pipe network between blowing sessions.

It has been observed in practice that draining melt water to the pipes requires only a few minutes when the water can flow to the pipe network along the aforementioned channels created by the airblowing. The transfer of a new charge of heating energy to the field requires 2–4 hours at reasonable output.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
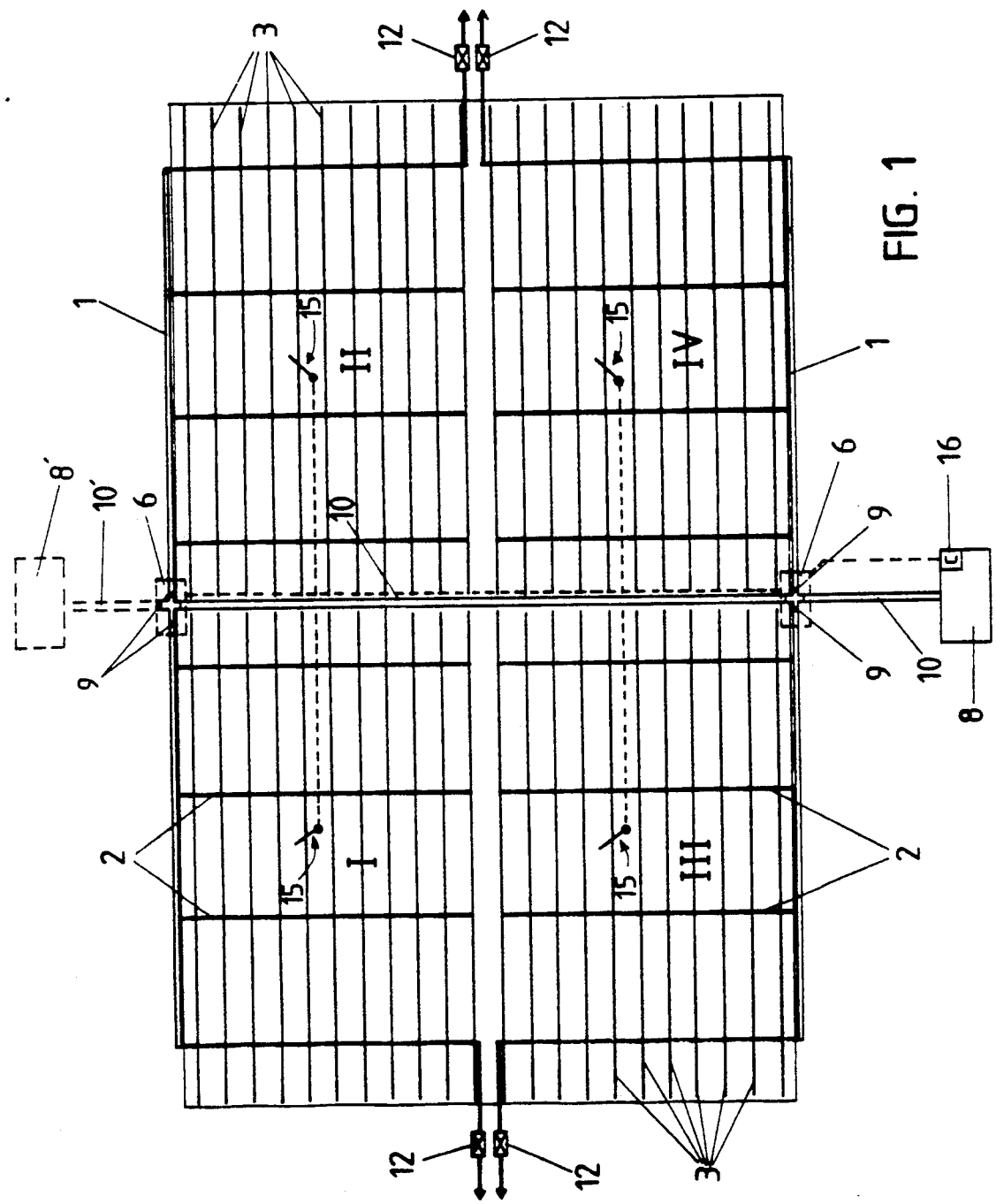
FIG. 1 is a plan View of a playfield illustrating a pipe network arrangement therein constructed in accordance with the present invention.

With reference to FIG. 1 of the drawings, a turf area of a sports field is divided into four separate pipe network sectors I–IV. A blower apparatus 8, in which there are also heating cells to warm the air to be blown, is located at the side of the field. A feed pipe 10 is communicated from blower 8 to the main pipe 1 of the pipe network sections I–IV. Main pipes 1 have valves 9 on each by means of which it is possible to blow air or cut off the air blowing to each section I-IV separately.

If additional output is required, it is possible to also connect a second blower apparatus 8' through an extension 10' of the feed pipe to the opposite side of the field.

The main pipes 1 are located on the long side of the field and they are connected at regular intervals to distribution pipes 2, which extend from the side of the field from main pipe 1 to essentially the center of the field. All the distribution pipes 2 of the same main pipe 1 are connected to multi-purpose pipes 3, which run in the same direction as the main pipe 1, these being most advantageously made of perforated field drain pipe covered with bolting cloth or similar.

The distribution pipes 2 are located in a sloping position in such a way that they rise continually from the main pipe 1. Main pipe 1 also slopes gently towards the feed pipe. The central part of the multi-purpose pipes 3 between the distribution pipes 2 and their extreme ends are at least one inch higher than their connections to allow the water to run to the distribution pipes 2.

Figure 2:
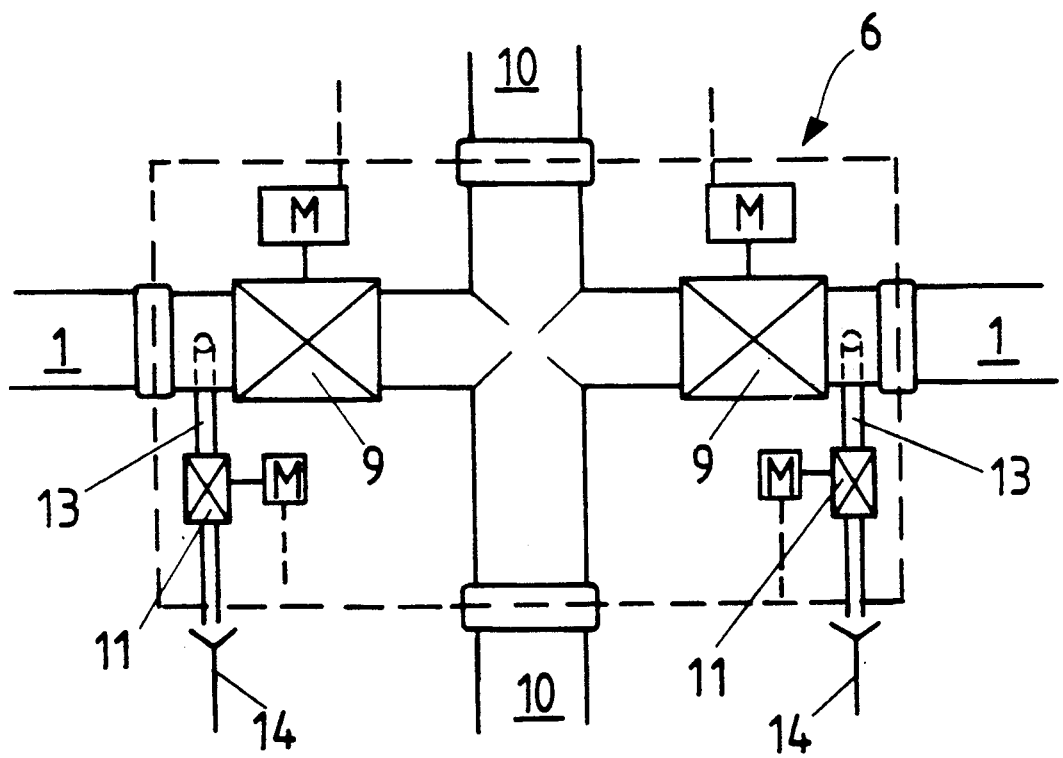
FIG. 2 is a plan view of a valve unit belonging to the pipe network arrangement of FIG. 1.

Rain and melt water flows from the multipurpose pipes 3 to the distribution pipes 2 and from there to the appropriate main pipe 1, the lower end of which is connected to the valve unit 6, shown in FIG. 2. This has on both sides an outlet pipe 13 leading to a rainwater drain 14, and which is connected to the lower surface of the pipe in the immediate vicinity of the main pipe 1 connection. The outlet pipe 13 includes a valve 11 equipped with an operating device M, by means of which this line can be shut off if required. These valves 11 are not absolutely necessary, because the amount of air lost through the outlet pipe 13 during warm air blown is little.

Valves 9 and 11 are controlled by a control device or manually. The operating devices M of the valves 9 and 11 are low-voltage, so that there are no high-tension cables at all in the area of the field.

The connection between the feed pipe 10 and the main pipe 1 is a prefabricated unit 6, which contains outlet pipes 13 and valves 9 and 11 with operating device M. This simplifies the installation of the pipe network. In this installation, valve unit 6 forms a crosspiece, to which the pipes 1 and 10 to be connected are attached by means of simple clip connections. Any possible unused attachment point is plugged.

Each extreme end of the pipe network has a valve 12, which is normally closed. The valves 12 are only opened if the ground is frozen completely solid, in which case they create a through flow in the pipe network, which de-freezes the frozen ground when the air begins to flow through the ground. The valves 12 are then closed. Valves 12 are manually operated and located in a suitable maintenance pit.

The method of operating the pipe network system in accordance with the invention differs from previous ones in that here the warm air is blow in turn between sections I and II and correspondingly sections III and IV. Particularly during the de-freezing of the field a considerable savings in energy is achieved, because the water that has melted during the blowing phase is permitted to flow freely to the pipe network, so that it need not be evaporated. On the basis of practical tests, a four-hour blowing phase cycle has been arrived at, so that the rest phase is also four hours. A considerably shorter time is sufficient for the run-off of the melt water as such, but it is not practical to use a very large heat output. The pipe network arrangement shown in FIG. 1 also makes other lengths of cycles possible. Blowing can be freely controlled in the 1st, 2nd, 3rd, or 4th sections in turn.

The blowing and watering is also controlled on the basis of the data from the temperature and moisture sensors 15 located in each of the sections. These are located between the growing layer and the filter layer. When aerial irrigation devices (not shown) are also connected to this same control system, the heating and watering of the field take place automatically. If required, the automation directs more or less watering or heating to a section on the basis of the data provided by the section sensor 15.

11 kW is sufficient power for the motors of the fans and 100 kW sufficient output for the heating cell for a normal-size football playing field in northern latitudes, when cycles are used. The fan produces air at 2 $m^3/s$ at a pressure of 3000 pascals and the maximum temperature of the air is 50° C.

The dampness caused by rainwater during the summer can be effectively removed by means of air blowing. Cycling is very important here too, so that the excess water can flow freely to the pipe network at intervals. During the summer, blowing without heating can be used, if the temperature and moisture content of the external air permit it.

The net-like pipe network in each of the sections of the field as shown in FIG. 1 is preferred. The diameter of the main pipe is typically 400 mm, that of the distribution pipes 200 mm, and that of the multi-purpose pipes 50 mm. The feed pipe 10 between the blowing apparatus 8 and the main pipe 1 has a diameter of 500 mm.

Figure 3:
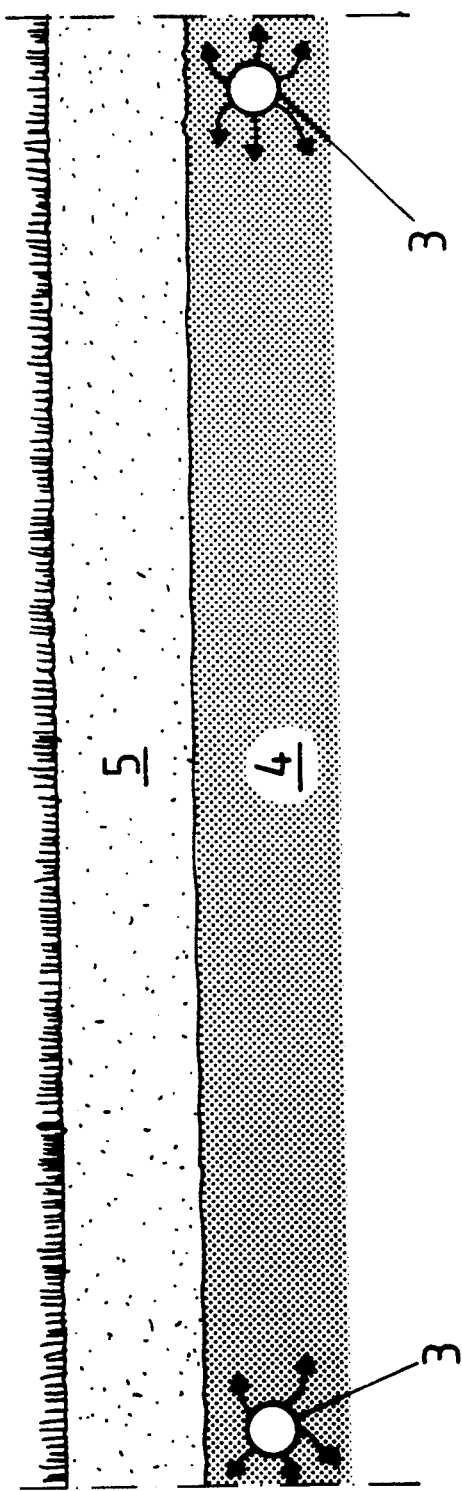
FIG. 3 is a sub-elevational view sectional view of the playfield illustrating the location of multi-purpose pipes in a filter layer of the field.

A cross-section of the structure of the field is shown in FIG. 3. In accordance with a known technique, the multi-purpose pipes are located in a filter layer 4, in which the air penetration is considerably better than that in a growing layer 5. On account of this, the multi-purpose pipes 3 can be located at a considerable distance from one another without this having an effect on the distribution of the heating field. In practical tests, a preferred interval of about two meters has been arrived at.

Figure 4:
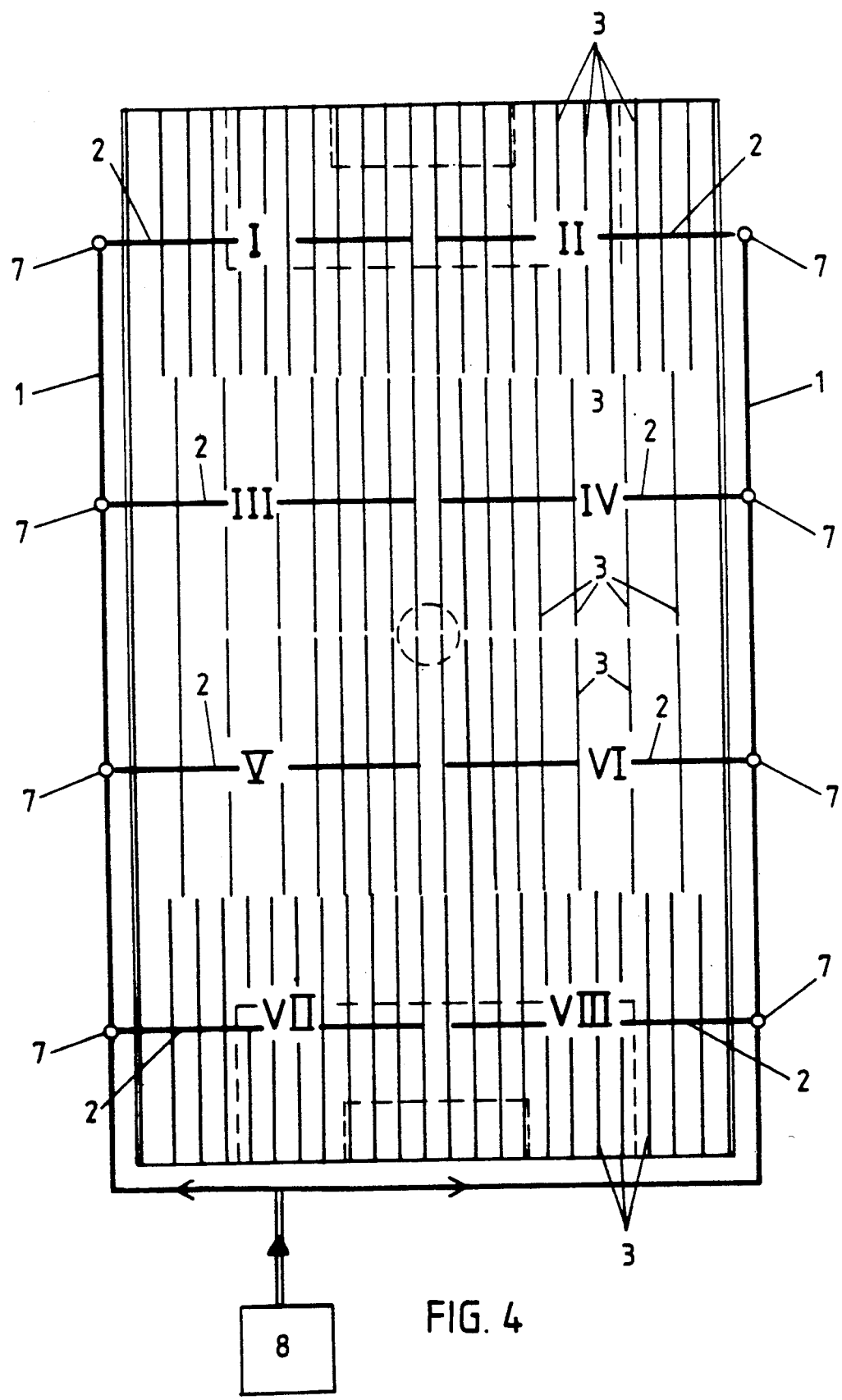
FIG. 4 is a plan view of an alternative arrangement of the pipe network in a playfield.

FIG. 4 shows an alternative arrangement of locating the pipe network in a sports field. In FIG. 4, the same reference numbers as in FIG. 1 are used for the corresponding components of the network. Here, a continually forking pipe network is used, in which case main pipe 1 divides into feed pipes 10 on both sides. These, in turn, divide into distribution pipes 2 inwards, from which in turn, the multi-purpose pipes 3 divide to cover the entire area of the field. Here, the connections of the distribution pipes 2 and the main pipe 1 include valves 7. Drying valves are also installed together with them, and the water that has run into the distribution pipes is led to a field drain through them. By means of them the blowing can be cycled in many different ways between the various section I-VIII of the field.

Compared to the solution of FIG. 1, the pipe network in accordance with FIG. 4 demands more work to build, because there are more valves and they are situated in different places. In one field, built in accordance with this invention, the pipe networks were grouped in pairs, in such a way that the blowing was directed to two groups at one time, that is to one quarter of the field while the others were in a rest cycle. The length of the blowing interval was three hours, when the run-off and heating evening cycle formed a total of nine hours.

Previous normal practice fields have been melted after winter by first transporting the snow off the field, after which possible de-freezing was commenced. Especially in the case of grassy playfields, it is advantageous to leave the snow layer in place and begin heating with air blowing from beneath the field. The snow layer protects vegetation from night frosts. In this sense, the snow layer replaces the protective covers used on some heated fields. Grass that begins to grow during the melting of the snow is able to benefit from the moisture from the snow and, on the other hand, energy is saved when the water is not evaporated as in a heating system.

At first, care should be taken not to raise the temperature of a turf field over +5° C. so that growth does not begin too early. Only once weather conditions are good or the field must be used, the temperature is raised over +7° C., when because of the preheating, the field is rapidly brought to playing condition.

A running track and pipe networks heating separate small sports areas, which can be brought into the blowing cycle, can be simply connected to a pipe network system in accordance with the invention.

While the best mode for carrying out the invention has been described in detail, those familiar with the art to which this invention relates will recognize various alternative embodiments for practicing the invention as defined by the following claims:

What is claimed is:

1. A method of removing moisture from a playfield having a surface layer and filter layer beneath the surface layer; the filter layer including at least two sloped pipes having perforations and which define first and second sections of a pipe network, the method comprising the sequential and continual steps of:

blowing air in a first direction through the first section for a first predetermined period to remove moisture from the surface layer;

stopping the blowing in the first section for a second predetermined period sufficient to collect the removed moisture by accumulating it in the first section through the perforations thereof;

blowing air in a first direction through the second section during the second predetermined period to remove moisture from the surface layer;

flowing the accumulated moisture in the first section via sloped flow in a direction opposite to the one direction for removal of the moisture from the playfield during the second determined period; and flowing the accumulated moisture in the second section via sloped flow in a direction opposite to the one direction for removal of the moisture from the playfield during the first predetermined period.

2. A method of de-freezing and removing moisture from a playfield having a snow covered surface layer and a filter layer beneath the surface layer; the filter layer including a sloped pipe having perforations comprising the steps of:

blowing heated air in one direction through the pipe for a predetermined period to thaw and remove moisture from the surface layer, said period being sufficiently limited so as to initially preserve any snow covering;

stopping the blowing for a second predetermined period sufficient to collect the removed moisture by accumulating it in the pipe through the perforations thereof; and flowing the accumulated moisture via sloped flow in a direction opposite to the one direction for removal of the moisture from the playfield.

3. The method of claim 2 wherein the playfield includes at least two sloped pipes having perforations that define two sections of a pipe network and said steps of blowing, stopping and flowing are sequentially alternated between the sections until the field is entirely unfrozen.

* * * * *